(12) United States Patent
Zhang

(10) Patent No.: US 9,146,889 B2
(45) Date of Patent: Sep. 29, 2015

(54) METHOD AND DEVICE FOR SENDING AND RECEIVING DATA

(75) Inventor: Na Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 14/000,696

(22) PCT Filed: Jul. 22, 2011

(86) PCT No.: PCT/CN2011/077503
§ 371 (c)(1),
(2), (4) Date: Sep. 17, 2013

(87) PCT Pub. No.: WO2012/113200
PCT Pub. Date: Aug. 30, 2012

(65) Prior Publication Data
US 2013/0346633 A1 Dec. 26, 2013

(30) Foreign Application Priority Data
Feb. 22, 2011 (CN) .......................... 2011 1 0043385

(51) Int. Cl.
*G06F 3/00* (2006.01)
*G06F 13/38* (2006.01)
(Continued)

(52) U.S. Cl.
CPC .............. *G06F 13/385* (2013.01); *G06F 3/038* (2013.01); *G06F 3/03542* (2013.01); *G06F 21/6218* (2013.01)

(58) Field of Classification Search
None
See application file for complete search history.

(56) References Cited

U.S. PATENT DOCUMENTS 6,819,677 B1 * 11/2004 Nouzovsky et al. .......... 370/466
7,522,545 B2    4/2009 Lou (Continued)

FOREIGN PATENT DOCUMENTS

CN    101281438 A    10/2008
CN    201260186 Y    6/2009

(Continued)

OTHER PUBLICATIONS

International Search Report in international application No. PCT/CN2011/077503, mailed on Nov. 24, 2011.

(Continued)

*Primary Examiner* — Elias Mamo
(74) *Attorney, Agent, or Firm* — Oppedahl Patent Law Firm LLC

(57) ABSTRACT

The disclosure discloses a method and device for sending and receiving data, which are used to solve the problem that the existing device having the function of the laser pen and the function of the data card cannot implement the integrated control over the function of the laser pen and the function of the data card. The device includes a main module and a connection module. The connection module is configured to connect to a PC by using a USB mode, and the main module communicates with the connection module by high frequency. The method for sending data includes: the main module encapsulates data to be sent according to a type of the data to be sent and identification information corresponding to the type of the data, and sends the encapsulated data to the connection module; and the connection module decapsulates the encapsulated data and sends the decapsulated data to the PC. Since the device determines the identification information corresponding to the type according to the type of the received data, and encapsulates the identification information and the data, in order to be capable of performing corresponding processing when needed, so that intelligent integration of the function of the laser pen and the function of the data card is implemented and an intelligent control over the function of the laser pen is implemented.

8 Claims, 4 Drawing Sheets

(51) Int. Cl.
*G06F 3/038* (2013.01)
*G06F 3/0354* (2013.01)
*G06F 21/62* (2013.01)

(56) References Cited

U.S. PATENT DOCUMENTS

| | | | |
|---|---|---|---|
| 7,660,611 B1 * | 2/2010 | Asbury et al. | 455/574 |
| 8,897,304 B2 * | 11/2014 | Hong et al. | 370/395.2 |
| 2003/0028688 A1 | 2/2003 | Tiphane et al. | |
| 2004/0095929 A1 * | 5/2004 | Aoshima | 370/389 |
| 2006/0007151 A1 * | 1/2006 | Ram | 345/163 |
| 2006/0197744 A1 | 9/2006 | Tiphane et al. | |
| 2006/0253625 A1 | 11/2006 | Lou | |
| 2007/0061436 A1 * | 3/2007 | Bae et al. | 709/223 |
| 2007/0081486 A1 | 4/2007 | Koide | |
| 2007/0174639 A1 * | 7/2007 | Reckless | 713/193 |
| 2008/0075102 A1 * | 3/2008 | Madsen et al. | 370/419 |
| 2010/0011055 A1 * | 1/2010 | Lin et al. | 709/203 |

FOREIGN PATENT DOCUMENTS

| | | |
|---|---|---|
| CN | 101599224 A | 12/2009 |
| CN | 201515379 U | 6/2010 |
| CN | 101771543 A | 7/2010 |
| CN | 102123441 A | 7/2011 |
| DE | 10052699 A1 | 5/2002 |

OTHER PUBLICATIONS

English Translation of the Written Opinion of the International Search Authority in international application No. PCT/CN2011/077503, mailed on Nov. 24, 2011.

Supplementary European Search Report in European application No. 11859607.1, mailed on Dec. 5, 2014. (9 pages—see entire document).

Craig Ranta et al: "Human Interface Device (HID) Profile 1.0", Internet Citation, May 22, 2003, pp. 1-123, XP002486381, Retrieved from the Internet: URL: http://www.bluetooth.com/NR/rdonlyres/0BE438ED-DC1B-41D1-AAC0-1AAA956097A2/980/HID_SPEC_V10.pdf [retrieved on Jul. 15, 2008]. (See Supplementary European Search Report in European application No. 11859607.1 for relevant pages).

* cited by examiner

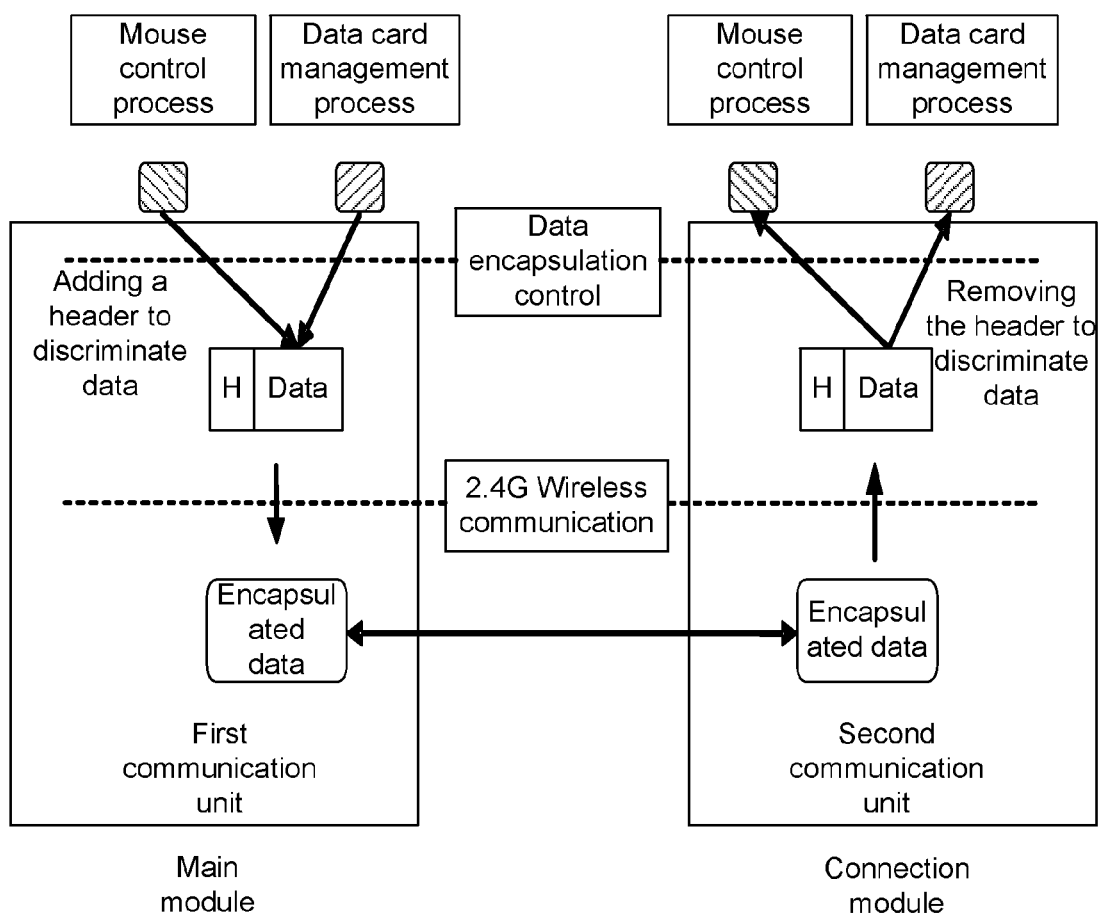

METHOD AND DEVICE FOR SENDING AND RECEIVING DATA

TECHNICAL FIELD

The disclosure relates to the field of data communication technology, and in particular to a method and device for sending and receiving data.

BACKGROUND

Along with continuous development of 3G wireless data service technology, not only a user provides a higher demand for service contents of a 3G network, but also service requirements are increasing. Therefore, it needs to provide more services in order to satisfy the increasing requirements of the user.

At present, a device having the function of a laser pen and a data card mostly integrates the function of the data card with the function of the laser pen simply, and the data card only implements one function at the same time, that is to say, when the data card is connected with a Personal Computer (PC), it can access a 3G network; when the data card is used as the laser pen, it has to be disconnected with the PC. Moreover, when the data card is used as the laser pen, it only has a simple indication function, that is to say, the data card projects red or green laser used as an indication, and the red or green laser moves on a projection screen along with movement of a hand of the user. When the user needs to perform page turning display on contents of projection, it is only implemented by controlling a keyboard or a mouse.

Therefore, for the device having the function of the laser pen and the data card in the related art, the function of the laser pen and the function of the data card thereof are superimposed simply, it cannot implement an integrated control over the function of the laser pen and the function of the data card, and cannot perform an intelligent control during an operation of the laser, so that the requirements of users cannot be satisfied.

SUMMARY

In view of this, an embodiment of the disclosure provides a method and device for sending and receiving data, which are used to solve the problem that an existing device having the function of the laser pen and the data card cannot implement integrated control over the function of the laser pen and the function of the data card.

A method for sending data provided by an embodiment of the disclosure is implemented by a device including a main module and a connection module. The connection module is configured to connect to a Personal Computer (PC) by using a USB connection mode, and the main module communicates with the connection module wirelessly. The method includes:
  the main module determines data to be sent corresponding to operation information according to the operation information input by a user;
  encapsulates identification information and the data to be sent according to an identified type of the data to be sent and the stored identification information corresponding to the type of the data, and sends the encapsulated data to the connection module; and
  the connection module decapsulates the encapsulated data received, and sends the data to be sent after being removed the identification information to the PC.

A method for receiving data provided by an embodiment of the disclosure is implemented by a device including a main module and a connection module. The connection module is configured to connect to a Personal Computer (PC) by using a USB connection mode, and the main module communicates with the connection module wirelessly. The method includes:
  the connection module receives data from the PC;
  the connection module encapsulates identification information and the data according to a type of the data and the stored identification information corresponding to the type of the data, and sends the encapsulated data to the main module; and
  the main module decapsulates the encapsulated data received, and performs corresponding processing on the data after being removed the identification information.

A device for sending and receiving data provided by an embodiment of the disclosure includes a main module and a connection module, the connection module is configured to connect to a Personal Computer (PC) by using a USB connection mode, and the main module communicates with the connection module wirelessly, wherein
  the main module is configured to determine data to be sent corresponding to operation information according to the operation information input by a user, to encapsulate identification information and the data to be sent according to a type of the data to be sent and the stored identification information corresponding to the type of the data, and send the encapsulated data to the connection module; or to decapsulate the encapsulated data received from the connection module, and to perform corresponding processing on the data after being removed the identification information; and
  the connection module is configured to decapsulate the encapsulated data received, and to send the data to be sent after being removed the identification information to the PC; or to receive data from the PC, to encapsulate identification information and the data according to a type of the data and the stored identification information corresponding to the type of the data, and to send the encapsulated data to the main module.

An embodiment of the disclosure provides a method and device for sending and receiving data. The device includes a main module and a connection module. Wherein, the connection module is configured to connect to a Personal Computer (PC) by using a USB connection mode, and the main module communicates with the connection module wirelessly. The method for sending data includes: the main module encapsulates identification information and the data to be sent according to a type of the received data to be sent and the stored identification information corresponding to the type of the data, and sends the encapsulated data to the connection module; and the connection module decapsulates the encapsulated data received, and sends the data to be sent after being removed the identification information to the PC. Since the device in the embodiment of the disclosure determines the identification information corresponding to the type according to the type of the received data, and encapsulates the identification information and the data, in order to perform corresponding processing, so that intelligent integration of the function of the laser pen and the function of the data card is implemented and an intelligent control over the function of the laser pen can also be implemented, thereby improving user experience.

BRIEF DESCRIPTION OF THE DRAWINGS

FIG. 3A is a schematic diagram of structures of respective units included in a main module and a connection module of a device when the type of the data to be sent, which the device provided by an embodiment of the disclosure sends, includes mouse control data and net play data;

DETAILED DESCRIPTION

In order to implement intelligent integration of the function of a laser pen and the function of a data card, an embodiment of the disclosure provides a method and device for sending and receiving data. The device includes a main module and a connection module. The connection module is configured to connect to a Personal Computer (PC) by using a USB connection mode, and the main module communicates with the connection module wirelessly. Specifically, the device has the function of the laser pen and the function of the data card.

In order to make the technical problem to be solved, the technical solution and beneficial effects of the disclosure more clear and understood, the disclosure is further illustrated in detail in combination with the drawings and embodiments below. It should be understood that the specific embodiments described here are only intended to interpret the disclosure instead of limiting the disclosure.

Figure 1:
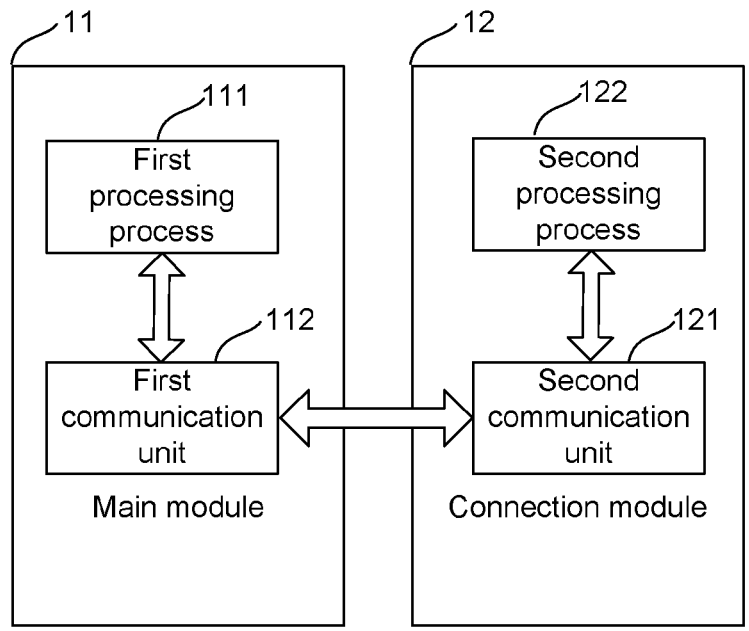
FIG. 1 is a schematic diagram of a structure of a device for sending and receiving data provided by an embodiment of the disclosure.

FIG. 1 is a schematic diagram of a structure of a device for sending and receiving data provided by an embodiment of the disclosure. The device includes a main module 11 and a connection module 12, wherein the main module 11 communicates with the connection module 12 wirelessly. Specifically, the main module 11 can communicate with the connection module 12 by high frequency, for example, by using a frequency range of 2.4 GHz.

The connection module 12 connects to a PC by using a USB connection mode.

The process of transmitting data between the device and the PC includes: the device sends data to be sent to the PC; and the device receives data to be sent from the PC.

Wherein, the process that the device sends data to be sent to the PC includes:

the main module 11 is configured to determine data to be sent corresponding to operation information according to the operation information input by a user, to encapsulate identification information and the data to be sent according to a type of the data to be sent and the stored identification information corresponding to the type of the data, and to send the encapsulated data to the connection module 12; and the connection module 12 is configured to decapsulate the encapsulated data received, and to send the data to be sent after being removed the identification information to the PC.

The process that the device receives data to be sent from the PC includes:

the connection module 12 is configured to receive, from the PC, data to be sent, to encapsulate identification information and the data to be sent according to a type of the data and the stored identification information corresponding to the type of the data, and to send the encapsulated data to the main module 11; and the main module 11 is configured to decapsulate the encapsulated data received from the connection module, and to perform corresponding processing on the data to be sent after being removed the identification information.

Specifically, the main module 11 includes a first processing process 111 and a first communication unit 112; the connection module 12 includes a second communication unit 121 and a second processing process 122. Wherein, when the device sends the data to be sent to the PC, the first processing process 111 is configured to determine the data to be sent corresponding to the operation information according to the operation information input by the user, and to send the data to be sent to the first communication unit 112;

the first communication unit 112 is configured to receive the data to be sent from the first processing process, to encapsulate the identification information and the data to be sent according to the type of the data to be sent and the stored identification information corresponding to the type of the data, and to send the encapsulated data to the second communication unit 121;

the second communication unit 121 is configured to decapsulate the encapsulated data received from the main module, to determine, according to a type of the decapsulated data to be sent, a processing process corresponding to the type of the data, and to send the data to be sent after being removed the identification information to the processing process; and the second processing process 122 is configured to send the data to be sent after being removed the identification information from the second communication unit 121 to the PC.

When the device receives the data to be sent from the PC, the second processing process 122 is configured to receive data from the PC, and to send the data to the second communication unit 121;

the second communication unit 121 is configured to encapsulate the identification information and the data according to the type of the data received form each process and the stored identification information corresponding to the type of the data, and to send the encapsulated data to the main module;

the first communication unit 112 is configured to decapsulate the encapsulated data from the connection module, to determine, according to a type of the decapsulated data, a processing process corresponding to the type of the data, and to send the data after being removed the identification information to the processing process; and the first processing process 111 is configured to perform processing on the data after being removed the identification information from the first communication unit.

In an embodiment of the disclosure, the data to be sent received by the device may be net play data, or may be mouse control data.

Preferably, the main module of the device has the function of accessing the 3G network and also has the functions of the laser pen and a wireless mouse. Specifically, a structure of a main module and a connection module and a connection relation among the main module, the connection module and a PC is shown in FIG. 2.

Figure 2:
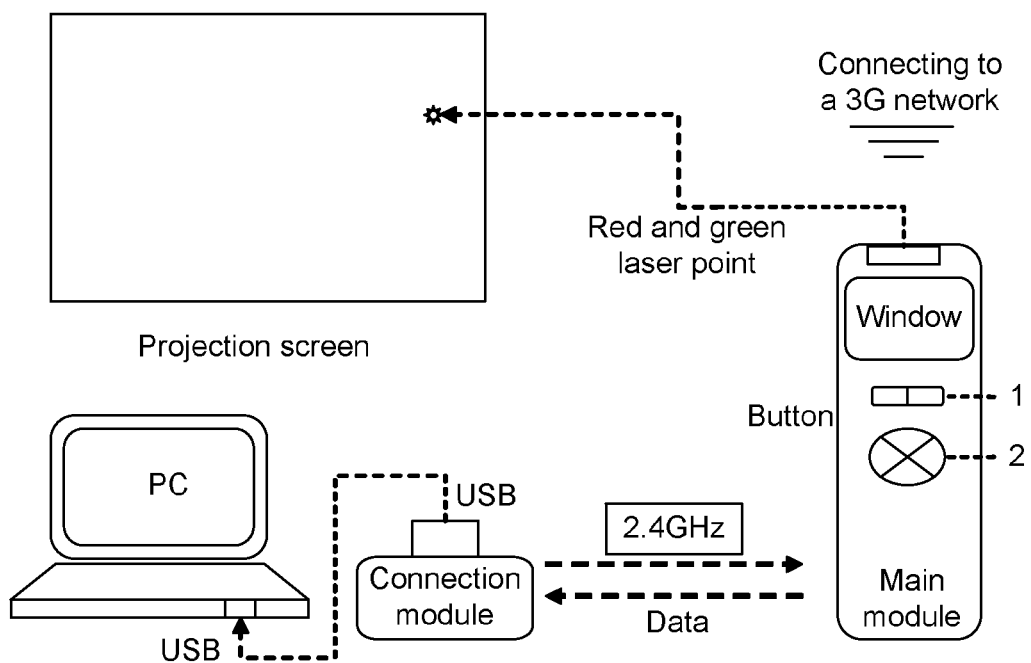
FIG. 2 is a structure of a main module and a connection module provided by an embodiment of the disclosure and a schematic diagram of a connection relation between the main module and connection module and a PC.

Based on FIG. 2, when implementing the function the laser pen, the main module can start laser by controlling a button at the side of the main module to implement the indication function of the laser to a document. Furthermore, the main module can also implement the function of the wireless mouse, and implement left and right button functions of the mouse by buttons 1 and 2 in the main module, so that the functions of opening and closing of the document and a webpage as well as page turning of the document can be controlled. In addition, the main module also includes the button 2, which is a button for implementing movement and position of the mouse in four directions, i.e., "up, down, left, and right" directions. The main module is separated from the PC, and the main module can be powered by a separate power source such as a lithium battery, a storage battery or the like, therefore the main module is used more conveniently. Moreover, a mother tank for receiving the connection module can also be provided in the main module for easy portability.

Specifically, each data to be sent is acquired by each processing process in the main module of the device, the data to be sent is sent to the first communication unit of the main module by the processing process. For example, when the type of the data to be sent of the device includes the mouse control data and the net play data, the first processing process included in the main module may include a mouse control process and a data card management process. Similarly, there are a corresponding mouse control process and a corresponding data card management process in the connection module, which send to a PC processing process corresponding data to be sent.

The main module and the connection module both include the communication unit, communication between the first communication unit of the main module and the second communication unit of the connection module can be implemented by 2.4 GHz wireless technology, the operation frequency range thereof is between 2.405 GHz and 2.485 GHz, or can also be implemented by a wireless communication means such as bluetooth, wifi and the like.

FIG. 3A is a schematic diagram of structures of respective units included in a main module and a connection module of a device when the type of the data to be sent, which the device provided by an embodiment of the disclosure sends, includes mouse control data and net play data. The main module includes a first processing process and a first communication unit, and the first processing process includes a mouse control process and a data card management process. The connection module includes a second communication unit and a second processing process, wherein the second processing process includes a mouse control process and a data card management process.

Figure 3B:
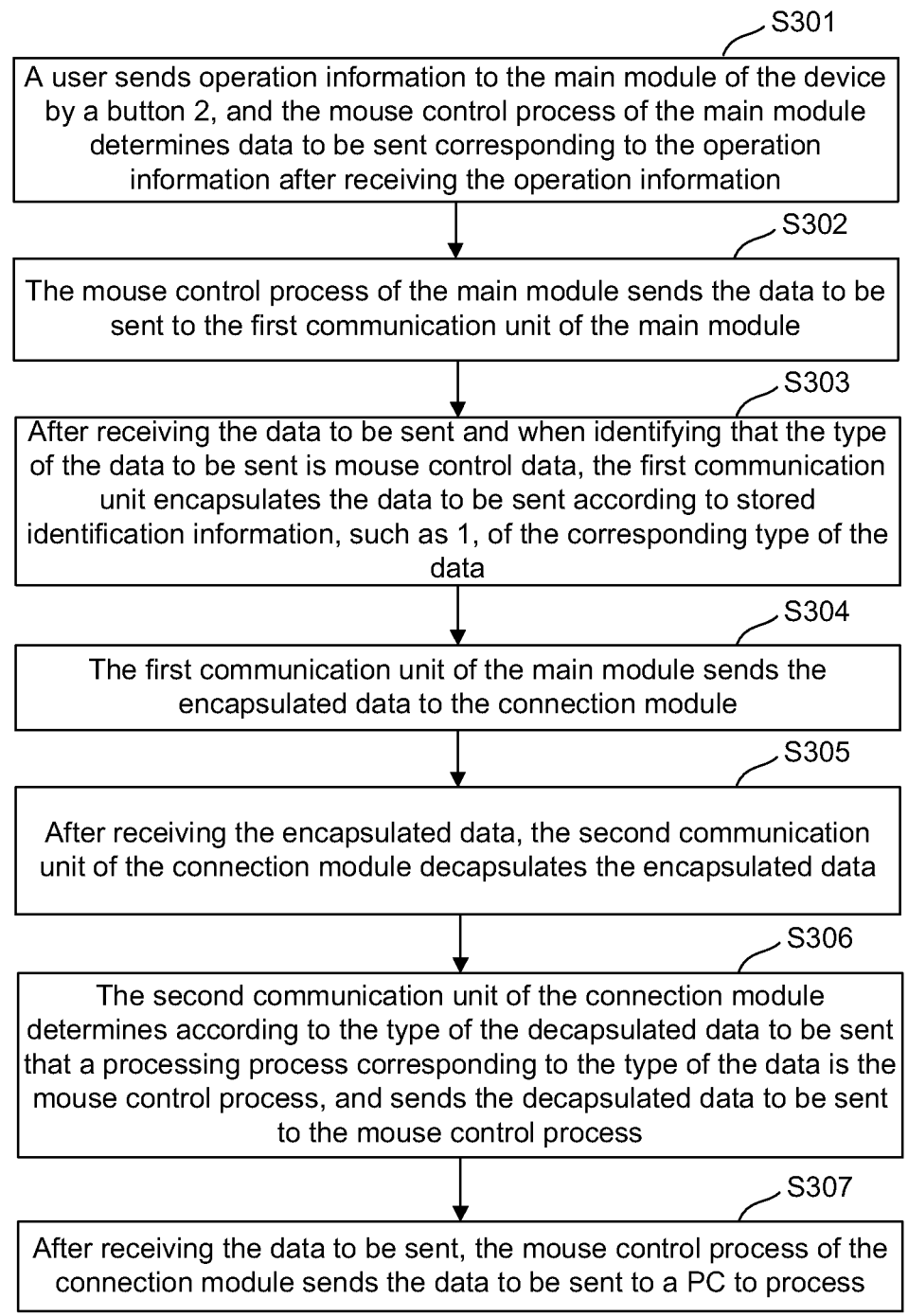
FIG. 3B illustrates a process of sending data by the device in detail in combination with the schematic diagram of the structure of the device shown in FIG. 3A when the device implements a mouse control function, e.g., implements a function of "up, down, left, and right" movements of a mouse according to an embodiment of the disclosure.

FIG. 3B illustrates a process of sending data by the device in detail in combination with the schematic diagram of the structure of the device shown in FIG. 3A when the device implements a mouse control function, e.g., implements a function of "up, down, left, and right" movements of a mouse according to an embodiment of the disclosure. The process of sending data includes the following steps:

Step S301: a user sends operation information to the main module of the device by a button 2, and the mouse control process of the main module determines data to be sent corresponding to the operation information after receiving the operation information.

Wherein, the mouse control process is the first processing process of the main module.

Step S302: the mouse control process of the main module sends the data to be sent to the first communication unit of the main module.

Step S303: after receiving the data to be sent and when identifying that the type of the data to be sent is mouse control data, the first communication unit encapsulates the data to be sent according to stored identification information, such as 1, of the corresponding type of the data.

Specifically, the encapsulating the data to be sent includes: adding a header to the data to be sent, and the header contains identification information 1, wherein the header occupies few bytes and only occupies 1 bit.

Step S304: the first communication unit of the main module sends the encapsulated data to the connection module.

When the first communication unit of the main module sends the encapsulated data to the connection module, whether the encapsulated data is the mouse control data or the net play data, the first communication unit treats the encapsulated data indiscriminately when sending the encapsulated data, and sends the encapsulated data to the connection module based on a high frequency communication protocol. That is to say, data packages of the encapsulated data are the same for the first communication unit, and all enter into a data sending queue of the first communication unit.

Step S305: after receiving the encapsulated data, the second communication unit of the connection module decapsulates the encapsulated data.

Step S306: the second communication unit of the connection module determines, according to the type of the decapsulated data to be sent, that a processing process corresponding to the type of the data is the mouse control process, and sends the decapsulated data to be sent to the mouse control process.

The mouse control process is the second processing process of the connection module.

Step S307: after receiving the data to be sent, the mouse control process of the connection module sends the data to be sent to a PC to process.

After the mouse control process of the connection module sends the data to be sent to the PC, a corresponding drive program of the PC processes and responds. The drive program of the PC can use function, such as GetCursorPos( ), SetCursorPos( ), mouse_event( ) and the like, to respond respectively according to the type of the data received from the connection module, in order to implement movements of a mouse. For example, when the data is data for implementing left movement of the mouse, the drive program uses a function GetCursorPos(point) to acquire the current location of the mouse, and adjusts the location of the mouse. A coordinate shifts a step length S (which can be set flexibly according to an actual condition) to the left, and point.x=point.x-S. Then the drive program determines a new location of the mouse according to a function SetCursorPos(point). Of course, a left button click operation MOUSEEVENTF_LEFTDOWN and a right button pop-up operation MOUSEEVENTF_RIGHTUP of the mouse can also be implemented by corresponding functions, and implementation modes are different based on different languages but the implementation principles are consistent essentially.

The above description is performed by taking that the data to be sent is the mouse control data as an example. Of course, when the data to be sent is the net play data, the process of sending the data to be sent between the main module and the connection module is similar as the above process, which is not described here repeatedly.

Since wireless communication between the main module and the connection module in the embodiment of the disclosure contains the net play data of the device and the control data of the wireless mouse, for the transmitted data, a layer of data is encapsulated to discriminate different types of data when the data are transmitted between the main module and the connection module. When the device operates in a high speed, the data volume of control data of the wireless mouse can be almost negligible with respect to the net play data received and sent by the device. Therefore, the control data of the wireless mouse transmitted between the main module and the connection module almost has no influence on a rate of data interaction between the device and the PC.

Figure 4:
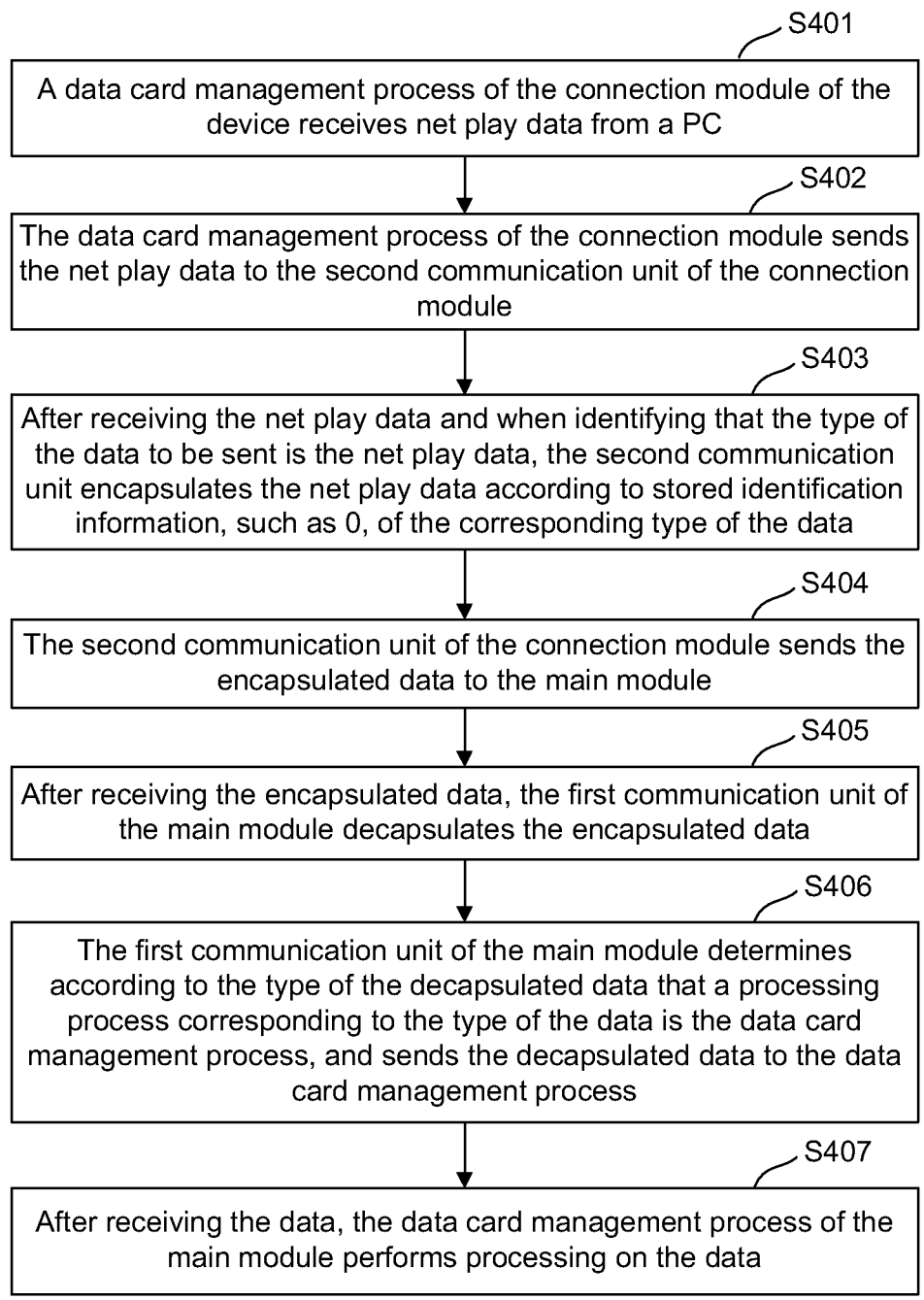
FIG. 4 illustrates a process of receiving data by the device in detail in combination with the schematic diagram of the structure of the device shown in FIG. 3A according to an embodiment of the disclosure.

FIG. 4 illustrates a process of receiving data by the device in detail in combination with the schematic diagram of the structure of the device shown in FIG. 3A according to an embodiment of the disclosure. This process includes the following steps:

Step S401: a data card management process of the connection module of the device receives net play data from a PC.

Wherein, the data card management process is the second processing process of the connection module.

Step S402: the data card management process of the connection module sends the net play data to the second communication unit of the connection module.

Step S403: after receiving the net play data and when identifying that the type of the data to be sent is the net play data, the second communication unit encapsulates the net play data according to stored identification information, such as 0, of the corresponding type of the data.

Specifically, the encapsulating the net play data includes: adding a header to the net play data, and the header contains identification information 0, wherein the header occupies few bytes and only occupies 1 bit.

Step S404: the second communication unit of the connection module sends the encapsulated data to the main module.

Step S405: after receiving the encapsulated data, the first communication unit of the main module decapsulates the encapsulated data.

Step S406: the first communication unit of the main module determines, according to the type of the decapsulated data, that a processing process corresponding to the type of the data is the data card management process, and sends the decapsulated data to the data card management process.

The data card management process is the first processing process of the main module.

Step S407: after receiving the data, the data card management process of the main module performs processing on the data.

An embodiment of the disclosure provides a method and device for sending and receiving data. The device includes a main module and a connection module. Wherein, the connection module connects to a Personal Computer (PC) by using a USB connection mode, and the main module communicates with the connection module by high frequency. The method for sending data includes: the main module encapsulates identification information and data to be sent according to a type of the received data to be sent and the stored identification information corresponding to the type of the data, and sends the encapsulated data to the connection module; and the connection module decapsulates the encapsulated data received, and sends the data to be sent after being removed the identification information to the PC. Since the device in the embodiment of the disclosure determines the identification information corresponding to the type according to the type of the received data, and encapsulates the identification information and the data, in order to perform corresponding processing, so that intelligent integration of the function of the laser pen and the function of the data card is implemented and an intelligent control over the function of the laser pen can also be implemented, thereby improving user experience.

The above description illustrates and describes a preferable embodiment of the disclosure. However, as previously mentioned, it should be understood that the disclosure is not restricted to the form disclosed by the present document and should not be regarded as exclusion of other embodiments, but can be used to various other combinations, modifications and environments and can be modified within the scope of conception of the disclosure described in the present document by the above teaching or technology or knowledge in related fields. Furthermore, modifications and changes made by those skilled in the art without departing from the spirit and principle of the disclosure shall fall within the scope of protection of the claims of the disclosure.

INDUSTRIAL APPLICABILITY

A method and device for sending and receiving data provided by the disclosure includes a main module and a connection module. The main module encapsulates identification information and data to be sent according to a type of the received data to be sent and the stored identification information corresponding to the type of the data, and sends the encapsulated data to the connection module; the connection module decapsulates the encapsulated data received, and sends the data to be sent after being removed the identification information to a PC. The disclosure implements intelligent integration of the function of the laser pen and the function of the data card, and can also implement an intelligent control over the function of the laser pen, thereby improving user experience.

What is claimed is:

1. A method for sending data, which is implemented by a device including a main module and a connection module, the connection module is configured to connect to a Personal Computer (PC) by using a USB connection mode, and the main module communicates with the connection module wirelessly, the method comprising:
    determining, by the main module, data to be sent corresponding to operation information according to the operation information input by a user;
    encapsulating identification information and the data to be sent according to an identified type of the data to be sent and the identification information corresponding to the type of the data, and sending the encapsulated data to the connection module; and
    decapsulating, by the connection module, the encapsulated data received, and sending the data to be sent after being removed the identification information to the PC;
    wherein the types of the data to be sent comprise: a type of internet data and a type of mouse control data; the identification information is for identifying that the type of the data to be sent is the type of internet data or the type of mouse control data, and the identification information occupies 1 bit;
    wherein the device acts as a data card when the type of the data to be sent is the type of internet data; the device acts as a wireless mouse when the type of the data to be sent is the type of mouse control data.

2. The method according to claim 1, wherein the determining data to be sent corresponding to operation information comprises:
    determining, by each process of the main module, data to be sent corresponding to operation information according to the operation information input by the user.

3. The method according to claim 1, wherein the sending the data to be sent after being removed the identification information to the PC comprises:

according to a type of the decapsulated data to be sent, determining, by the connection module, a process corresponding to the type of the data, and sending the data to be sent after being removed the identification information to the PC through the process.

4. A method for receiving data, which is implemented by a device including a main module and a connection module, the connection module is configured to connect to a Personal Computer (PC) by using a USB connection mode, and the main module communicates with the connection module wirelessly, the method comprising:

receiving, by the connection module, data from the PC;

encapsulating, by the connection module, identification information and the data according to a type of the data and the identification information corresponding to the type of the data, and sending the encapsulated data to the main module; and decapsulating, by the main module, the encapsulated data received, and performing corresponding processing on the data after being removed the identification information;

wherein the types of the data comprise: a type of internet data and a type of mouse control data; the identification information is for identifying that the type of the data to be sent is the type of internet data or the type of mouse control data, and the identification information occupies 1 bit;

wherein the device acts as a data card when the type of the data is the type of internet data; the device acts as a wireless mouse when the type of the data is the type of mouse control data.

5. The method according to claim 4, wherein the performing corresponding processing on the data after being removed the identification information comprises:

according to a type of the decapsulated data, determining, by the main module, a process corresponding to the type of the data, and performing the corresponding processing on the data after being removed the identification information through the process.

6. A device for sending and receiving data, comprising: a main module and a connection module, the connection module is configured to connect to a Personal Computer (PC) by using a USB connection mode, and the main module communicates with the connection module wirelessly, wherein the main module is configured to determine data to be sent corresponding to operation information according to the operation information input by a user, to encapsulate identification information and the data to be sent according to a type of the data to be sent and the stored identification information corresponding to the type of the data, and to send the encapsulated data to the connection module; or to decapsulate the encapsulated data received from the connection module, and to perform corresponding processing on the data after being removed the identification information; and the connection module is configured to decapsulate the encapsulated data received, and to send the data to be sent after being removed the identification information to the PC; or to receive data from the PC, to encapsulate identification information and the data according to a type of the data and the stored identification information corresponding to the type of the data, and to send the encapsulated data to the main module wherein the types of the data or the data to be send comprise: a type of internet data and a type of mouse control data; the identification information is for identifying that the type of the data to be sent is the type of internet data or the type of mouse control data, and the identification information occupies 1 bit;

wherein the device acts as a data card when the type of the data or the data to be send is the type of internet data; the device acts as a wireless mouse when the type of the data or the data to be send is the type of mouse control data.

7. The device according to claim 6, wherein the main module further comprises:

a first processing process configured to determine the data to be sent corresponding to the operation information according to the operation information input by the user, and to send the data to be sent to a first communication unit; or to perform processing on the data after being removed the identification information from the first communication unit; and the first communication unit configured to receive the data to be sent from each process, to encapsulate the identification information and the data to be sent according to the identified type of the data to be sent and the stored identification information corresponding to the type of the data, and to send the encapsulated data to the connection module; or to decapsulate the encapsulated data from the connection module, to determine, according to a type of the decapsulated data, a processing process corresponding to the type of the data, and to send the data after being removed the identification information to the processing process.

8. The device according to claim 6, wherein the connection module comprises:

a second communication unit configured to decapsulate the encapsulated data received from the main module, to determine, according to a type of the decapsulated data to be sent, a processing process corresponding to the type of the data, and to send the data to be sent after being removed the identification information to the processing process; or to encapsulate the identification information and the data according to the type of the data received form each process and the stored identification information corresponding to the type of the data, and to send the encapsulated data to the main module; and a second processing process configured to send the data to be sent after being removed the identification information from the second communication unit to the PC; or to receive data from the PC, and to send the data to the second communication unit.

* * * * *